(12) United States Patent　　　　　(10) Patent No.:　US 12,627,981 B1
　　Vantieghem et al.　　　　　　　　　(45) Date of Patent:　　May 12, 2026

(54) SECURITY APPLICATION AND METHOD FOR CONTROLLING ROUTER SECURITY, CYBER VULNERABILITIES AND MALWARE

(71) Applicants: Brigitte Vantieghem, Milton, GA (US); Francis Chlarie, Bruges (BE)

(72) Inventors: Brigitte Vantieghem, Milton, GA (US); Francis Chlarie, Bruges (BE)

(*) Notice: Subject to any disclaimer, the term of this patent is extended or adjusted under 35 U.S.C. 154(b) by 146 days.

(21) Appl. No.: 18/506,626

(22) Filed: Nov. 10, 2023

Related U.S. Application Data

(60) Provisional application No. 63/424,398, filed on Nov. 10, 2022.

(51) Int. Cl.
| | |
|---|---|
| *H04L 29/08* | (2006.01) |
| *H04W 12/088* | (2021.01) |
| *H04W 12/122* | (2021.01) |
| *H04L 9/00* | (2022.01) |
| *H04L 9/40* | (2022.01) |

(52) U.S. Cl.
CPC ....... *H04W 12/088* (2021.01); *H04W 12/122* (2021.01); *H04L 9/002* (2013.01); *H04L 63/14* (2013.01); *H04L 63/1433* (2013.01)

(58) Field of Classification Search
CPC .. H04W 12/088; H04W 12/122; H04L 9/002; H04L 63/14; H04L 63/1433
See application file for complete search history.

(56) References Cited

U.S. PATENT DOCUMENTS

| | | | |
|---|---|---|---|
| 2019/0081958 A1* | 3/2019 | Lee ........................ | H04L 63/145 |
| 2020/0104852 A1* | 4/2020 | Douglas, Jr. ........ | H04L 63/1408 |
| 2020/0137103 A1* | 4/2020 | Ngo ........................ | G06F 40/20 |
| 2020/0213344 A1* | 7/2020 | Sivagnanam .......... | G05B 15/02 |
| 2020/0382952 A1* | 12/2020 | Alonso Cebrian ... | H04W 12/64 |
| 2020/0404502 A1* | 12/2020 | Trivellato ............. | H04W 48/16 |
| 2021/0243268 A1* | 8/2021 | Davis ................... | H04L 67/303 |

* cited by examiner

*Primary Examiner* — Ellen Tran

(57) ABSTRACT

Methods are provided, for controlling router security, cyber vulnerabilities and malware. Such methods may be implemented, for example, via a security application.

9 Claims, 7 Drawing Sheets

SECURITY APPLICATION AND METHOD FOR CONTROLLING ROUTER SECURITY, CYBER VULNERABILITIES AND MALWARE

CROSS-REFERENCE TO RELATED APPLICATION

This application claims the benefit of U.S. Provisional Application No. 63/424,398 filed on Nov. 10, 2022, the entire contents of which are hereby incorporated herein by reference.

TECHNICAL FIELD

This application relates generally to mobile security, and more specifically relates to tools (e.g., a method, application software, etc.) for a mobile terminal to be protected for router security and to be resilient against cyber vulnerabilities, malware, etc.

BACKGROUND

Mobile devices are becoming increasingly ubiquitous, and users have tendencies to store sensitive information and take other actions that are normally done on non-mobile computing platforms. Malicious parties may seek to compromise the security of a user's mobile device to steal data, snoop on a user's communication, or perform some other type of fraudulent actions. Thwarting malicious code is difficult for the mobile environment. Each user of a Wi-Fi can be the victim of a cyber-attack, as cyber criminals find new ways to exploit vulnerabilities in information technology equipment.

Thus, there is a need in the mobile security field for tools or provisions to protect users of a wireless local area network (LAN), or another digital environment, and to help them become and stay cyber resilient, such as when internet access is obtained through a home internet router.

BRIEF SUMMARY

This application provides a disclosure of various inventive aspects that may be implemented, singly or in combination, to shield a mobile terminal connected via a router to a Wifi. The following is merely a brief summary of some of such aspects.

In an exemplary embodiment, a security application scans the router through the Wifi network, to determine whether one or more ports are open, and displays, for each open port, a port number and a description of a port service of the open port.

In another aspect, the security application may determine whether the router is susceptible to one or more vulnerabilities, and display, for each such vulnerability, a description of the vulnerability.

In another aspect, the security application may determine whether an IP address of the user terminal is associated with malware incidents and spamming activities, and display, for engines that have blacklisted the IP address, a description of the engines.

Other inventive aspects would also be apparent from reading the detailed description that follows, and/or from reading the listing of claims appended to the detailed description

BRIEF DESCRIPTION OF THE DRAWINGS

The features of the subject matter of this disclosure can be more readily understood from the following detailed description with reference to the accompanying drawings wherein:

FIG. 3 shows a schematic representation of a router security window of the security application shown in FIG. 1;

FIG. 4 shows a schematic representation of another router security window of the security application shown in FIG. 1;

DETAILED DESCRIPTION

Figure 1:
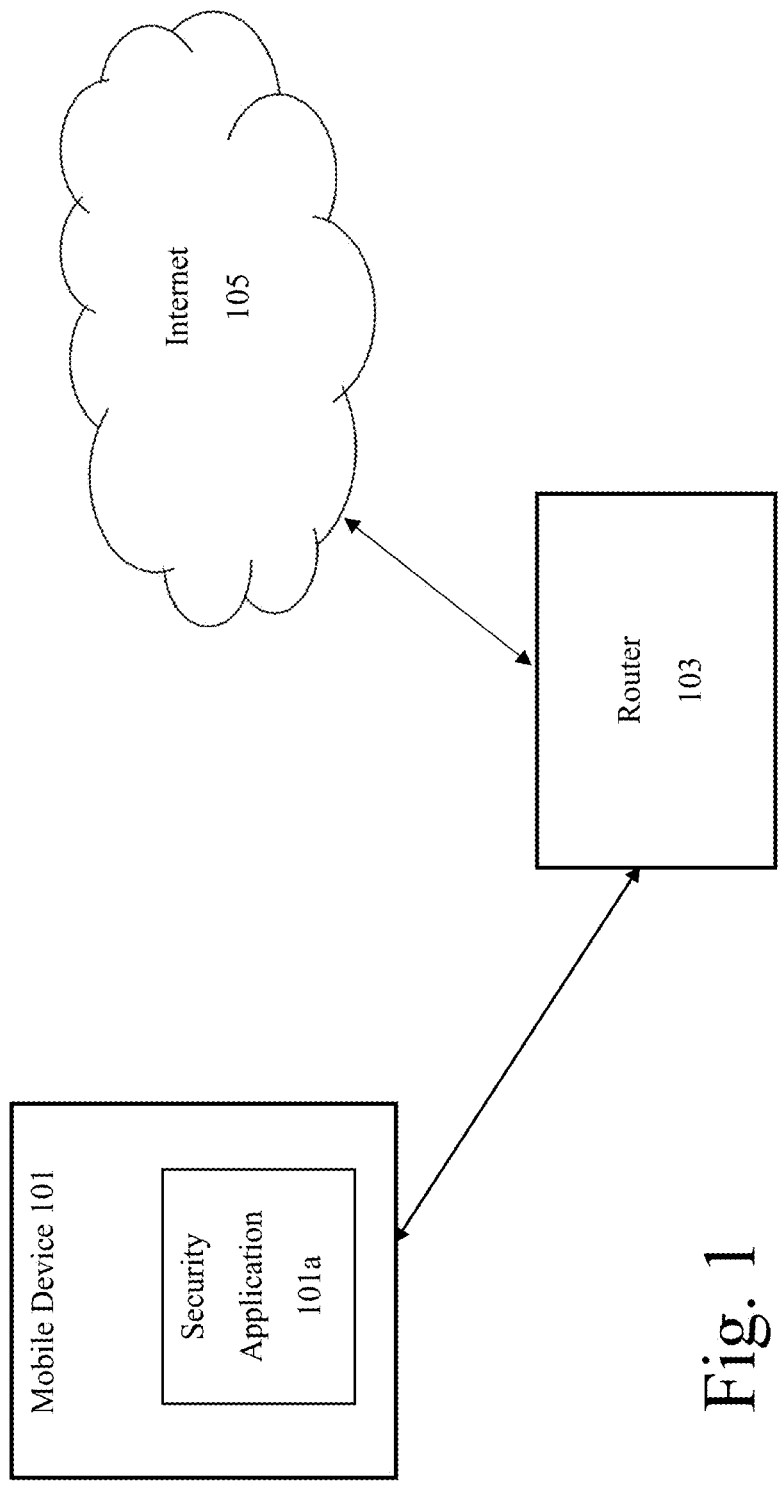
FIG. 1 shows a block diagram of a system including a security application operating in accordance with an embodiment of the present application.

A listing of claims is appended to this detailed description and various inventive aspects are described in such claims in the listing. However, such aspects as well as other inventive aspects would also be apparent to the skilled person upon reading the detailed description of preferred embodiments of the invention that follows, with some reference to the drawings, to enable any person skilled in the art to make and use the invention.

In describing preferred embodiments illustrated in the drawings, specific terminology is employed for the sake of clarity. However, the disclosure of this patent specification is not intended to be limited to the specific terminology so selected and it is to be understood that each aspect of the embodiments includes all technical equivalents that operate in a similar manner. In addition, a detailed description of known functions and configurations will be omitted when it may obscure the subject matter of the present invention.

In the preferred embodiment shown in FIG. 1, a mobile device 101 (such as, for example, a smartphone or tablet-type device, although it should be apparent that many, if not all, of the aspects may be implemented for other devices, such as laptop computer, other Wifi-enabled devices, such as having a digital assistant integrated with a voice interface, etc.) is configured to communicate through router 103 with destinations in the Internet 105. The mobile terminal 101 (e.g., mobile phone) has a security application 101a (also referred to herein as "app", such as when referring to application front end or to client on the host device) thereon. The app may be obtained (not shown) through typical channels (e.g., preinstalled on host device; or on demand via a hyperlink on a Web page or in an email or text message; or from common application sources, such as Apple App Store, Google Play Store, Microsoft Store, etc.). Alternatively, the app may be obtained on demand via a SaaS process through the Web.

Various aspects discussed herein may be implemented in the security application 101a. The security application is commonly used when the host device is connected to a Wi-Fi (also referred to herein as "wifi" or "Wifi"). However, it should be understood that the security app can be configured for use on a host device even when such device is connected to a wireless LAN (local area network) other than a home wifi, or is connected to a wired LAN (e.g., via an Ethernet-type connection) or via an access point.

In a typical scenario, the security app 101*a* checks the security of the Internet connection when the terminal 101 is in the environment of the router 103. Further, the security app 101*a* continues to run in the background and update data as the terminal 101 remains connected to the router 103.

An example of various features will now be discussed with reference to FIGS. 2A-2D. In such example, a security application may include provisions directed to protecting router security (FIG. 2B), against data breach (FIG. 2C) and pertaining to social media (FIG. 2D).

Figure 2A:
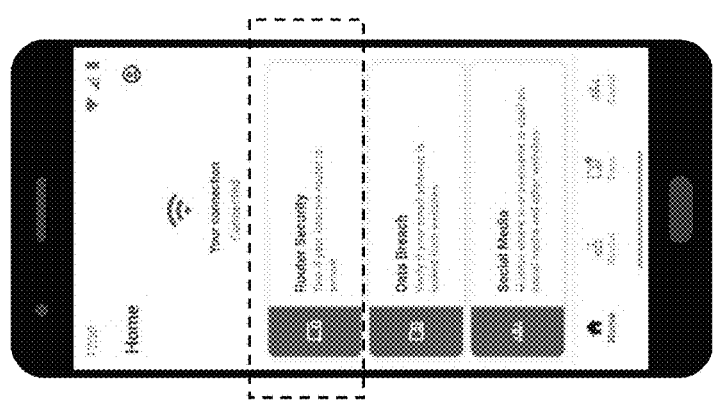
FIGS. 2A-2D show schematic representations of respective services of a security application.
Figure 2B:
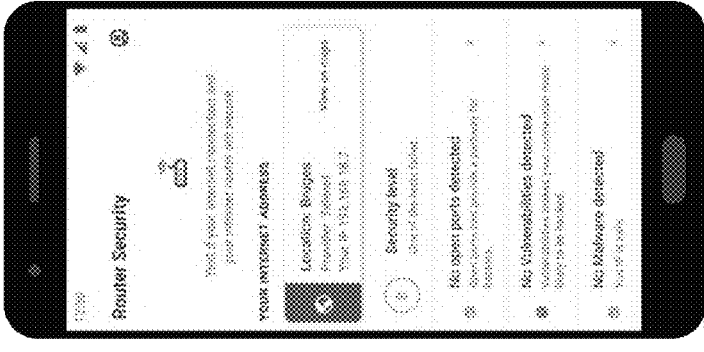
Figure 2C:
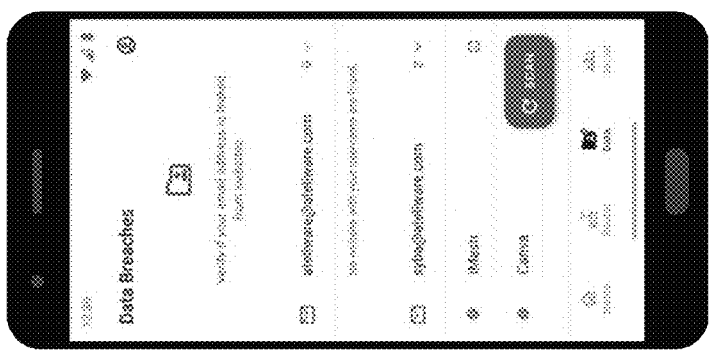
Figure 2D:
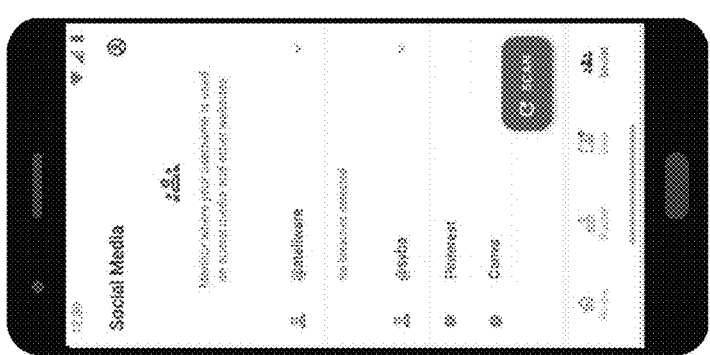

When the user selects provisions directed to router security (such as shown in FIG. 2A), the security application can provide, for example, information regarding whether the internet connection and the router are secure. For example (FIG. 2B), the security application displays, as a part of the user interface, address information, such as the location of the connection, the provider of the internet service and the IP address employed by the mobile terminal. The security application may also provide the option of displaying where the mobile terminal is situated relative to a local map.

In addition, the security application can highlight a security level classification which points out whether any one or more of the router security tests have failed. For example, level A can correspond to all of the router security tests indicating OK status, level B can indicate that one of the tests failed [e.g., in the example of FIG. 2B, a test pertaining to vulnerabilities has not passed], and level C can indicate that more than one test failed.

Figure 3:
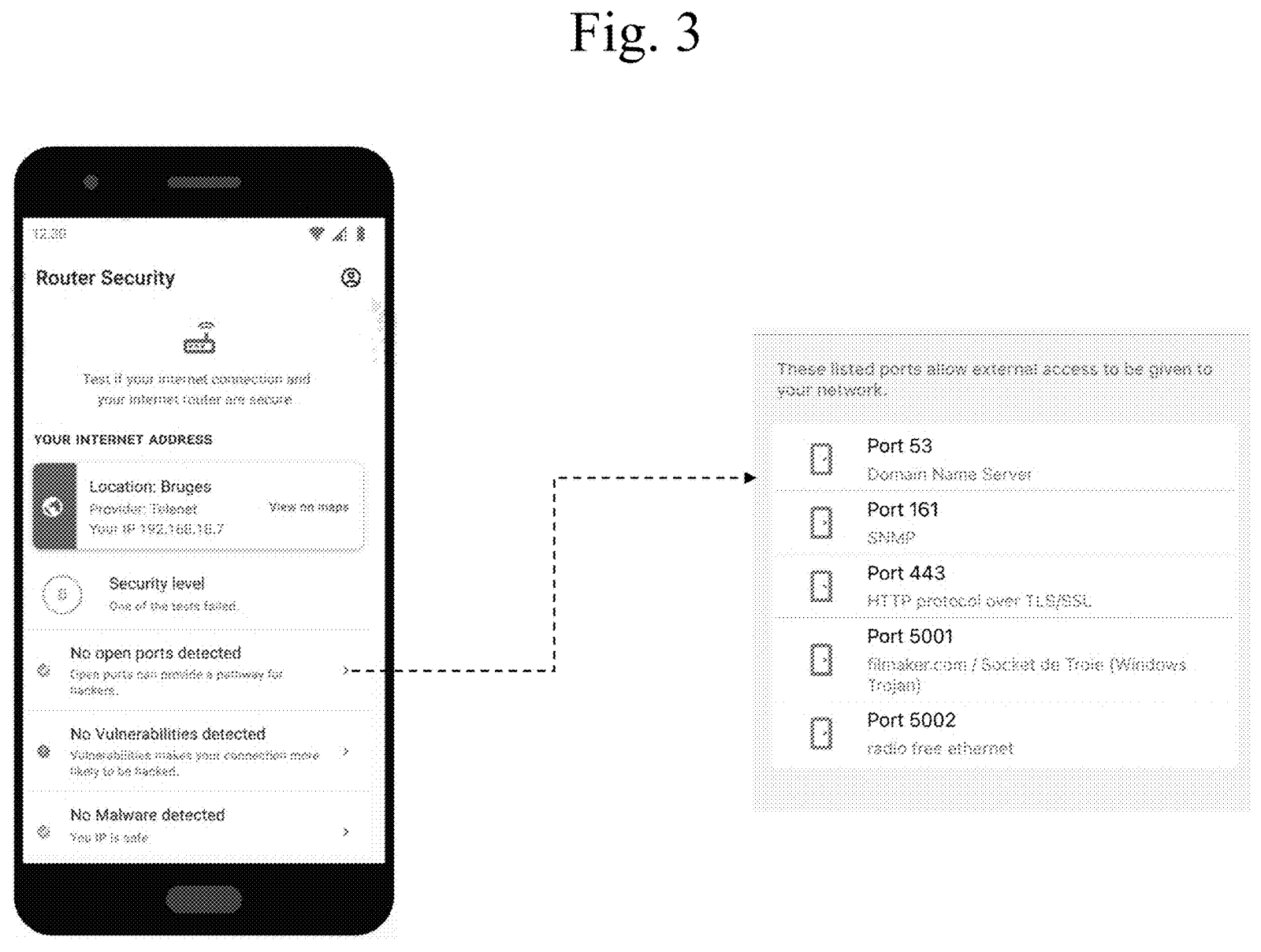

The security application may determine and provide information permitting the user to determine how secure is the internet connection. As shown in FIG. 3, the application can determine and provide information regarding whether any ports are open. However, as a consequence of an open port, a hacker may utilize the open port as a pathway to do damage. While ports can be opened or closed, an unused port should be kept closed at all times to reduce the risks of hackers using it to gain access to the device or network. Ports work like the main house door, that is, if the door is left open, it can be risky as anyone can get into the home.

In any case, the security application 101*a* can also determine and inform the user whether the host device has vulnerabilities that make it susceptible to be hacked. In addition, the security application may determine whether any malware have been detected via the connection.

Generally, the user does not need the ports too often. However, the security application determines whether any of the ports are open. When the mobile terminal is connected to the router, used for making the internet connection, the button to the left of the "No open ports detected" message may change its appearance (e.g., change from green color check mark as in FIG. 3, to red color "X" mark). The user has the option to click on the graphical element to the right (e.g., arrow in FIG. 3) at which time a detailed screen is shown with all of the open ports that were detected. In the example shown in FIG. 3, the detailed screen may show, per open port, the port number and a description of the port service.

For example, port 53 corresponding to a Domain Name Server (DNS) may be open, such as in FIG. 3. When port 53 corresponding to a DNS is open, it may mean, for example, that the terminal is intentionally running a DNS (or proxy), or it has been compromised and someone is using it as a mechanism to control or access the system. As another example, if port 53 is listening on the network environment, there may be some terminal being shared and it may be permitted by the router. As another example, other terminals on the WiFi may try to reach the mobile terminal for DNS information. Although a DNS server cannot attract requests by merely running, a DHCP (Dynamic Host Configuration Protocol) server can provide such configuration automatically, just as with a normal home router.

In addition, in the example shown in FIG. 3, port 161 is open for SNMP (Simple Network Management Protocol). SNMP can be used by the router to communicate logging and network management information with remote monitoring applications, if the terminal is on the network. SNMP can use User Datagram Protocol (UDP) as its transport protocol, and in such case, SNMP ports may be utilized via UDP 161 for SNMP Managers communicating with SNMP Agents (i.e. polling). However, SNMP can also run over Transmission Control Protocol (TCP), Ethernet, IPX, and other protocols. SNMP can be implemented over both protocols, UDP and TCP, via LAN but SNMP packets are typically sent over UDP. For example, SNMP agents listen on UDP port 161, whereas asynchronous traps are received on port 162. UDP allows devices with different hardware or software to share information with one another. Almost every network device answers SNMP requests, and thus network management tools have access to information from nearly every device connected to the network. IT administrators use SNMP monitoring to detect and manage devices, gain insights into performance and availability, and ensure the health of the network.

It should be noted that the protocols TCP and UDP can be used in combination with the Internet Protocol to facilitate the transmission of datagrams from one computer to applications on another computer. TCP is a connection-oriented protocol that requires a logical connection to be established between the two processes before data is exchanged. This protocol guarantees delivery of data and that packets will be delivered in the same order in which they were sent. Guaranteed communication and delivery is the key difference between TCP and UDP. UDP is a connectionless protocol that allows data to be exchanged without setting up a link between processes. This protocol does not guarantee reliable communication because it assumes that error-checking and recovery services are not required. UDP may not have all the functionality of TCP but it is faster and this makes it actually better for some applications.

In addition, in the example of FIG. 3, port 443 corresponding to HTTPS protocol over TLS/SSL (Transport Layer Security/Secure Sockets Layer) is open. Since HTTPS is a secure protocol, the connection with port 443 is much more secure as the information is encrypted through TLS/SSL. SSL is the standard technology for keeping an internet connection secure and safeguarding any sensitive data that is being sent. It does this by making sure that any data transferred remain impossible to read. SSL uses encryption algorithms to scramble data in transit, preventing hackers from reading it as it is sent over the connection. TLS is an updated, more secure, version of SSL. When HTTPS (Hyper Text Transfer Protocol Secure) appears in the URL (e.g., when a website is secured by an SSL certificate), the details of the certificate, including the issuing authority and the corporate name of the website owner, can be viewed by clicking on the lock symbol on the browser bar.

On the other hand, in the example shown in FIG. 3, there are two instances of ports that have, very likely, been opened unbeknownst to the user, i.e., ports 5001 (Socket de Troie-Windows trojan) and 5002 (radio free ethernet). Upon clarification, such ports would likely be closed. In the typical scenario, the user would contact the helpdesk or administrator of the security application to close ports 5001/5002. In another possible embodiment, the user may be permitted to close the undesirable ports.

Figure 4:
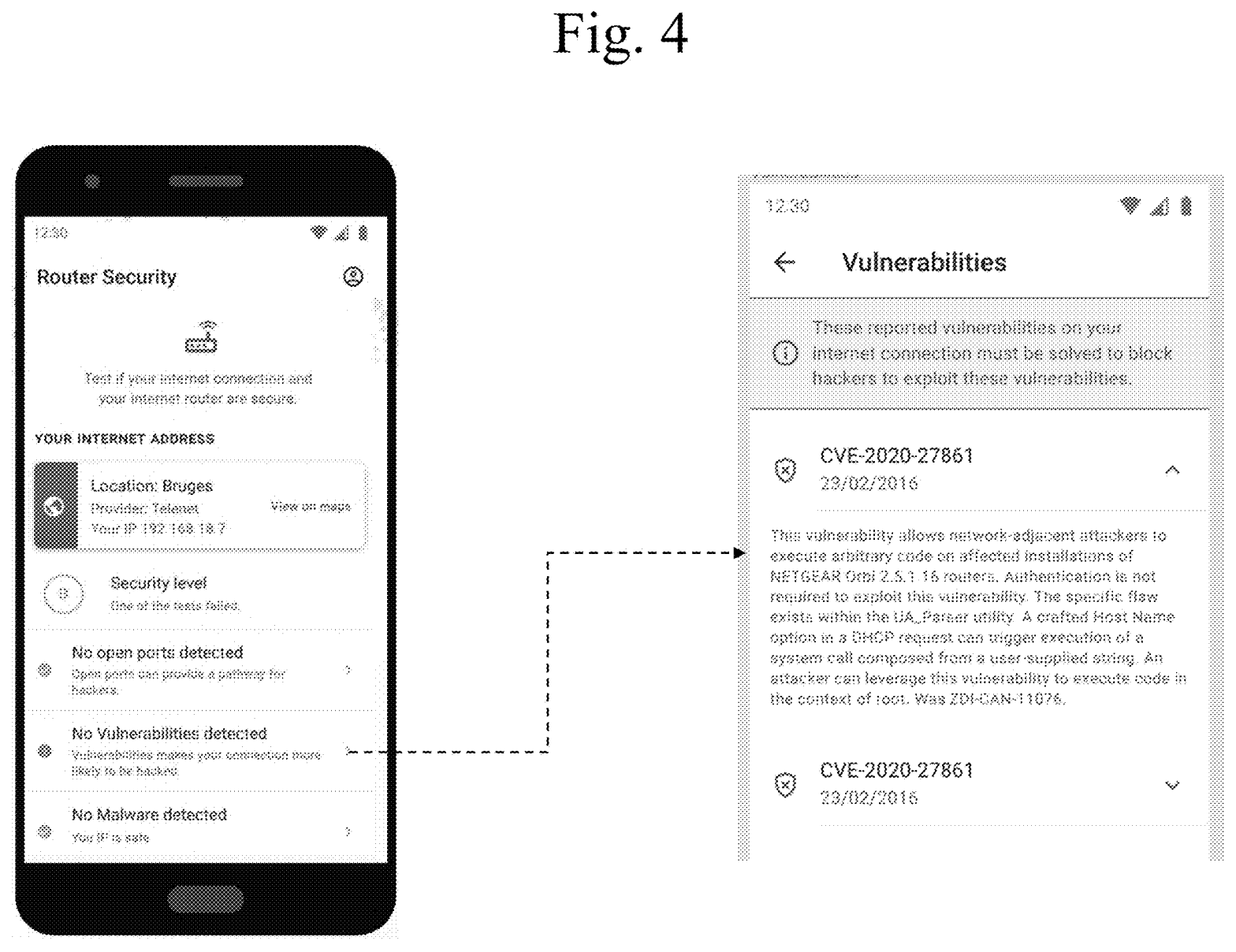

As another aspect of router security, the security application 101*a* preferably also detects vulnerabilities on the router 103. For example, the security application determines whether when the mobile terminal is connected to that router, which is used for making the internet connection, vulnerabilities are found. In the case that such vulnerabilities are found, the button to the left of the "No vulnerabilities detected" message on the router security screen becomes red color "X" mark. In such case, the user can click on the arrow to the right of the "No vulnerabilities detected" message to trigger display of all of the router vulnerabilities that were detected. For each vulnerability found, the CVE (Common Vulnerabilities and Exposures) the number and description of the vulnerability can be shown (FIG. 4). Each CVE number is a unique number assigned to the specific vulnerability.

Preferably, the displayed message warns that the reported vulnerabilities on the internet connection must be solved to block hackers from exploiting the vulnerabilities. In the typical scenario, the user would contact the helpdesk or administrator of the security application to determine how each vulnerability can be eliminated. Further, the user may be permitted to eliminate the vulnerability.

As another aspect of router security, the security application 101*a* determines whether the IP address used by the host device 101 is blacklisted. For example, the IP address with which the host device used to make the internet connection is scanned through multiple DNS-based blacklist (DNSBL) and IP reputation services, to facilitate the detection of whether the IP address was involved in malware incidents and spamming activities.

Figure 5:
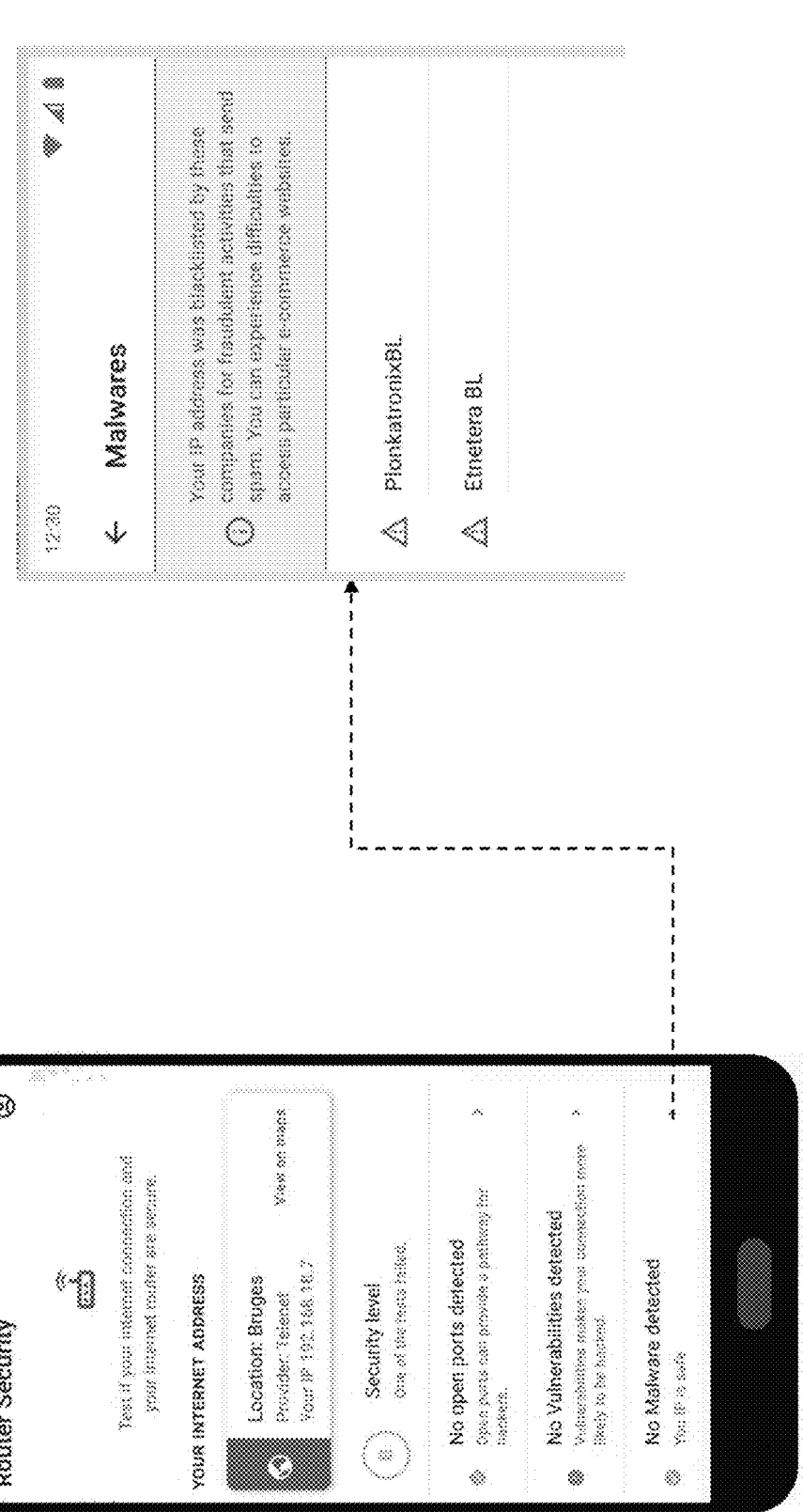
FIG. 5 shows a schematic representation of another router security window of the security application shown in FIG. 1.

When the security application 101*a* determines that the IP address has been blacklisted, then the button to the left of the "No Malware detected" message on the router security screen may change its appearance (e.g., change from green color check mark as in FIG. 5, to red color "X" mark). The user then can click on the arrow to the right of the "No Malware detected" message. When the arrow is clicked, a detailed screen is shown, listing the engines that have blacklisted the IP address associated with the terminal.

Figure 6:
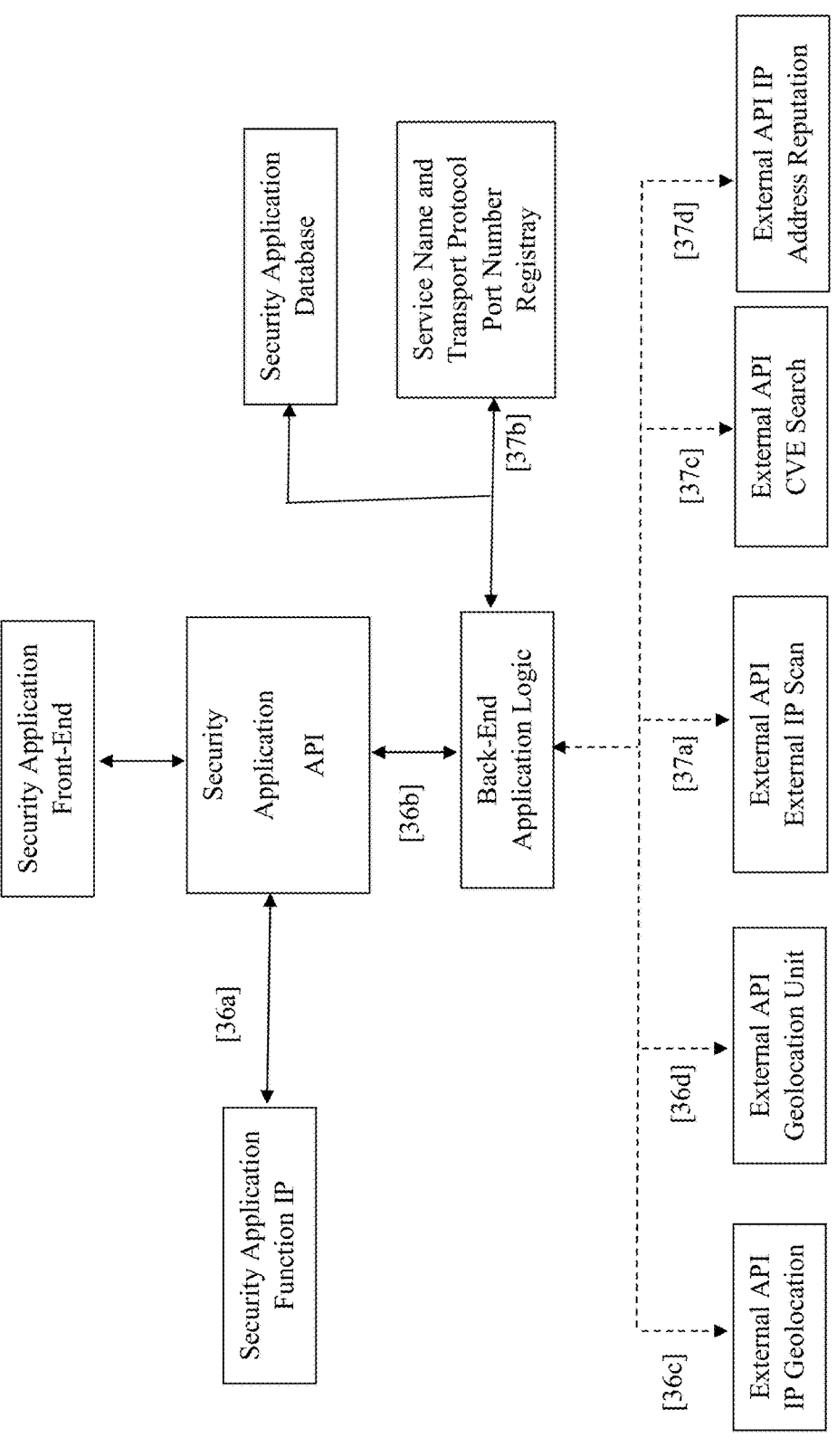
FIG. 6 shows a schematic representation of the security application shown in FIG. 1.
Figure 7:
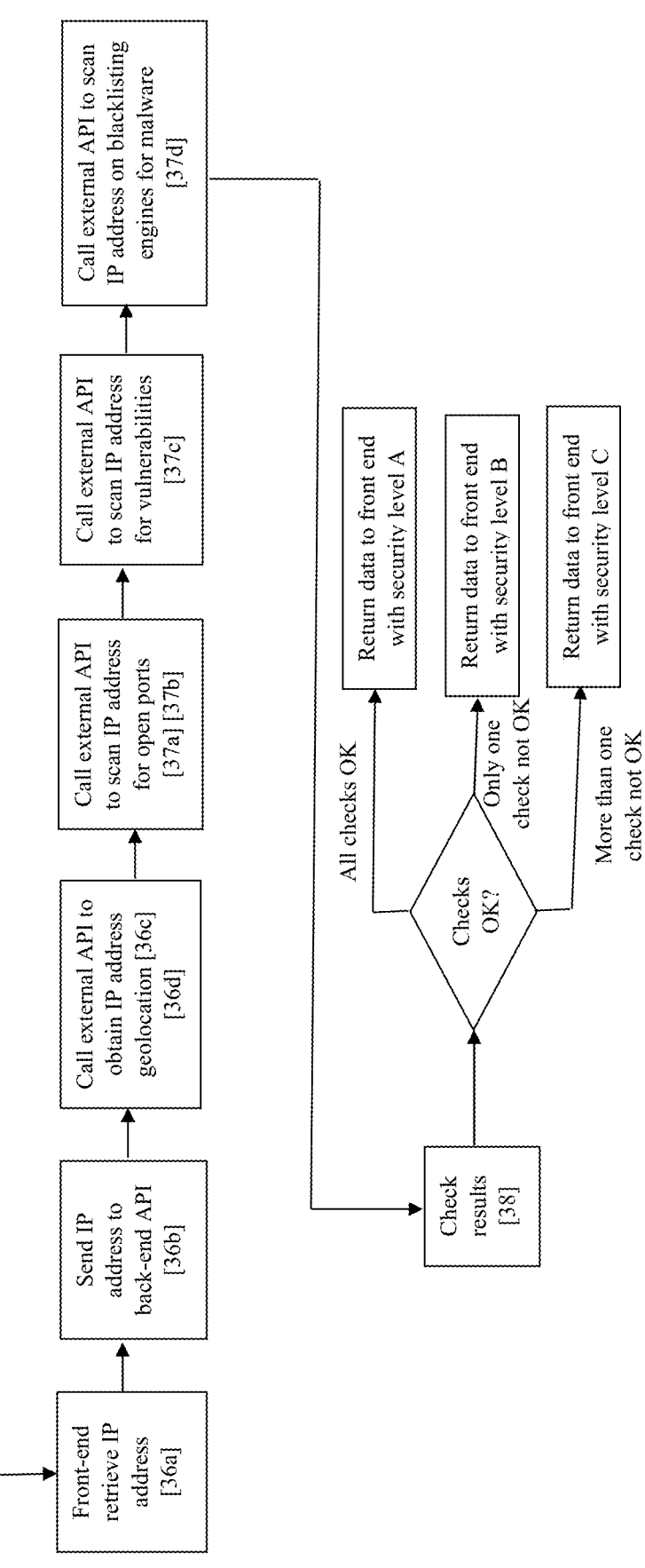
FIG. 7 shows a flow chart of a method performed by the security application shown in FIG. 1.

A process flow will now be explained, with reference to FIGS. 6 and 7. The process can start with the user clicking on the Router Security button in the app (FIG. 2A), or with opening the security application. Upon activation of the Router Security button, the front end of the security application retrieves the IP address of the mobile terminal (step 36*a*) and then sends such IP address to the API (Application Programming Interface) of the security application (step 36*b*).

The security application calls an external API to obtain the IP address geolocation (step 36*c*). From such external API, the IP address geolocation fields, such as, e.g., country, ISO countryCode, region, regionName, city, zip code, latitude, longitude, timezone, internet service provider name, organisation name, an ASN (Autonomous System Number) as an name, etc., are returned and stored in the database. Optionally, based upon the retrieved latitude and longitude coordinates, a map (e.g., Google) geolocation unit is called to visualize the location on a map in the front-end (step 36*d*).

Thereafter, the security application proceeds with a call to an external API to scan the IP address (of the terminal) for open ports (step 37*a*), as well as a call to an external API to determine vulnerabilities (step 37*c*). Through the APIs, the next fields (e.g., port number, vulnerability identifier) are returned and, when not null, are stored in the back-end database of the security application.

When a port number is found, the back-end server collects the port name from an internal port name list (step 37*b*) which can be an import from the Service Name and Transport Protocol Port Number Registry maintained by IANA (Internet Assigned Numbers Authority).

When a vulnerability number is found, the back-end server calls an external API for Public Web API of cve-search (step 37*c*). From such API the next fields (e.g., published date, vulnerability name; vulnerability summary and vulnerability solution) are returned and stored in the back-end database of the security application.

Thereafter, the security application proceeds with a call to an external API to scan IP address reputation in blacklisting engines (step 37*d*). When the API detects counts (i.e., a minimum of one) in the response, the next fields (e.g., blacklisting engine name, reference description and blacklisting engine URL) are stored in the back-end database of the security application.

All the results that are stored in the database are then also returned to the front-end of the end-user together with a security classification of A, B or C.

Next, the security application checks the results of the aforementioned tests (step 38). If all checks out, then the process returns with level A. On the other hand, if one of the checks result in being not OK, the process returns with level B. However, if two or more of the checks result in being not OK, the process returns with level CA.

The above specific embodiment is illustrative, and many variations can be introduced on these embodiments without departing from the spirit of the disclosure or from the scope of the appended claims.

For example, in another embodiment, once the app has been installed, the app can automatically scan the Wifi (or internet connection to which the app is connected) and publish the findings and the security level in the app to the user. After such scan, the app continues to detect whether there are new Wifi connections in the neighbourhood. When a new Wifi connection is detected, the IP address of that Wifi connection is sent to the back-end. The back-end performs the three tests (i.e., open ports, vulnerabilities and malware) and determines the security level. Such result is then pushed to the user as a notification on its smartphone or mobile phone screen. The notification shows the name of the Wifi connection and the security level. By sending a notification, the user is informed about the security of the Wifi connection even before the user starts using that Wifi connection.

Elements and/or features of different examples and illustrative embodiments may be combined with each other and/or substituted for each other (or omitted, where appropriate) within the scope of this disclosure and appended claims.

One skilled in the art will appreciate, for example, that embodiments of the invention may be interfaced to and controlled by computer readable storage media having stored thereon one or more computer programs to be executed on one or more computers. Each computer readable storage medium includes a plurality of components such as one or more of electronic components, hardware components, and/or computer software components. These components may include one or more computer readable storage media that generally stores instructions which collectively, when executed, constitute the security application disclosed herein. Examples of such computer readable storage media include a recordable data storage medium of a computer and/or storage device, such as, for example, floppy disks, magnetic tapes, CD-ROMs, DVD-ROMs, hard disk drives, and/or electronic memory. Other forms of non-transitory and/or tangible computer readable storage media not listed may be employed with embodiments of the invention.

A number of such components can be combined or divided in an implementation of a system. Further, such components may include a set and/or series of computer instructions written in or implemented with any of a number of programming languages, as will be appreciated by those skilled in the art.

What is claimed is:

1. A method performed by a security application of a user terminal connected via a router to a wireless network, comprising:

(a) scanning the router through the wireless network, to determine whether one or more ports are open, and displaying, for each open port determined to be amongst the ports that are open, a port number and a description of a port service being performed through the open port, said description permitting determination of whether the open port is targeted by a hacker and is to be closed;

(b) determining whether the router is susceptible to one or more vulnerabilities, and displaying, for each vulnerability determined to be amongst the vulnerabilities to which the router is susceptible, a description of the vulnerability; and (c) determining whether an IP address of the user terminal is associated with malware incidents and spamming activities, by searching for listing of the IP address of the user terminal in one or more external engines that maintain blacklists of terminals, and displaying a description of the engines that have blacklisted the IP address.

2. The method of claim 1, wherein (a), (b) and (c) are performed each time that a connection is made to the wireless network by the user terminal.

3. The method of claim 1, further comprising:

(d) displaying a security level selected from the following (i) through (iii);

(i) a first security level where all three tests (a), (b) and (c) passed; or (ii) a second security level where only one of the tests failed; or (iii) a third security level where more than one of the tests failed.

4. The method of claim 3, wherein (d) is performed each time that a connection is made to the wireless network by the user terminal.

5. The method of claim 1, wherein the description of the vulnerability displayed in (b) includes a CVE (common vulnerabilities and exposures) number.

6. A method performed by a security application of a user terminal connected via a router to a wireless network, comprising:

scanning the router through the wireless network, to determine whether one or more ports are open;

displaying, for each open port determined to be amongst the ports that are open, a port number and a description of a port service being performed through the open port, said description permitting determination of whether the open port is targeted by a hacker and is to be closed; and permitting one or more of the ports that are open to be closed.

7. The method of claim 6, further comprising:

displaying the IP address of the user terminal, a location of the IP address and an Internet service provider providing connection to the router.

8. A method performed by a security application of a user terminal connected via a router to a wireless network, comprising:

(a) determining whether an IP address of the user terminal is blacklisted as being associated with malware incidents and spamming activities, by searching for listing of the IP address of the user terminal in one or more external engines that maintain blacklists of the IP address of terminals; and (b) displaying a description of the engines that have blacklisted the IP address.

9. The method of claim 8, further comprising:

scanning the IP address of the user terminal through a plurality of Domain Name Service (DNS)-based blacklists and IP reputation services, to facilitate determination in (a) that the IP address has been involved in the malware incidents and spamming activities.

* * * * *